United States Patent [19]

Okada et al.

[11] Patent Number: 4,524,379
[45] Date of Patent: Jun. 18, 1985

[54] DOUBLE-SCANNING NON-INTERLACE TELEVISION RECEIVER WITH VERTICAL APERTURE CORRECTION CIRCUIT

[75] Inventors: Takashi Okada, Yokohama; Yasunari Ikeda, Funabashi; Yutaka Tanaka, Yokohama, all of Japan

[73] Assignee: Sony Corporation, Tokyo, Japan

[21] Appl. No.: 445,465

[22] Filed: Nov. 30, 1982

[30] Foreign Application Priority Data

Dec. 3, 1981 [JP] Japan ................................ 56-195427

[51] Int. Cl.³ ........................ H04N 9/535; H04N 5/14
[52] U.S. Cl. ...................................... 358/11; 358/140
[58] Field of Search ............... 358/11, 314, 140, 312; 340/728

[56] References Cited

U.S. PATENT DOCUMENTS

| | | | |
|---|---|---|---|
| 4,176,373 | 11/1979 | Dillion et al ........................ | 358/37 |
| 4,223,340 | 9/1980 | Bingham el al ..................... | 358/31 |
| 4,281,347 | 7/1981 | Tschannen .......................... | 358/37 |
| 4,400,719 | 8/1983 | Powers ................................ | 358/11 |
| 4,402,006 | 8/1983 | Karlock .............................. | 358/37 |

Primary Examiner—Michael A. Masinick
Attorney, Agent, or Firm—Lewis H. Eslinger; Alvin Sinderbrand

[57] ABSTRACT

A double-scanning non-interlace television receiver with a vertical aperture correction circuit for receiving an interlace television signal having alternating odd and even fields of scanned lines which are interlaced, as displayed, comprises a receiver circuit which receives the interlace television signal and which generates interlace scanning line signals for each of the fields, a visual display apparatus, a non-interlace converting circuit which converts the interlace scanning line signals for each of the fields to non-interlace scanning line signals which are displayed on the visual display apparatus, with each of the scanned lines being scanned twice, and a high frequency emphasizing circuit which emphasizes the high frequency components of the interlace scanning line signals.

23 Claims, 20 Drawing Figures

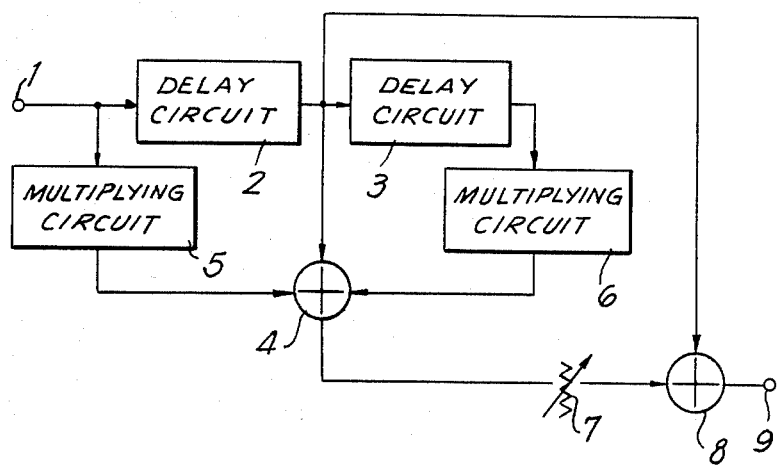
FIG.1
PRIOR ART
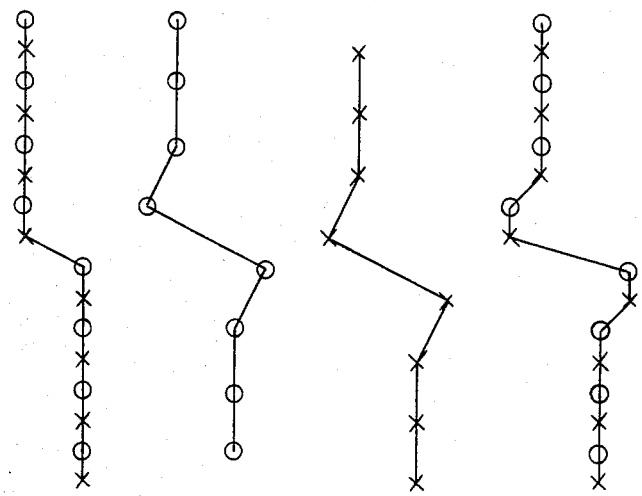
FIG.2a
PRIOR ART
FIG.2b
PRIOR ART
FIG.2c
PRIOR ART
FIG.2d
PRIOR ART FIG.3
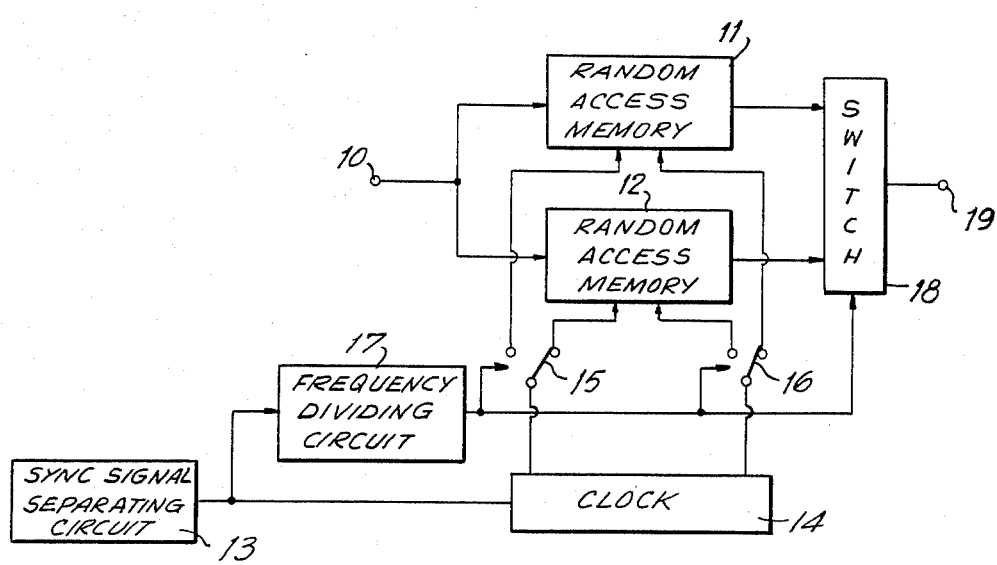
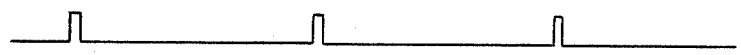
FIG.4a
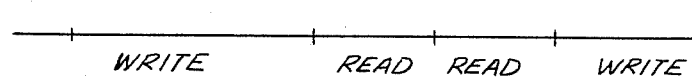
FIG.4b
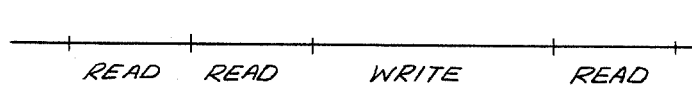
FIG.4c
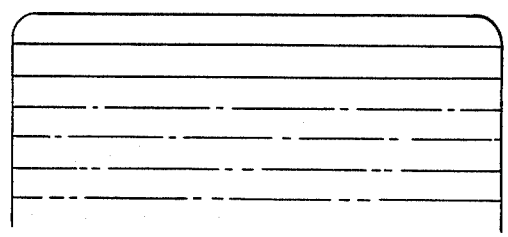
FIG.5

FIG.6
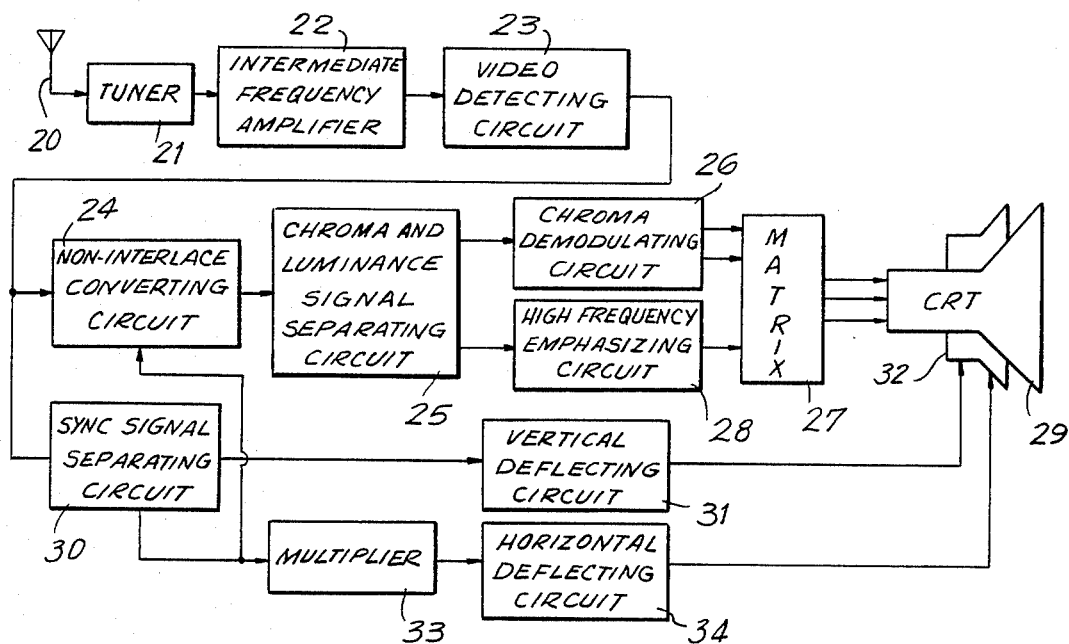
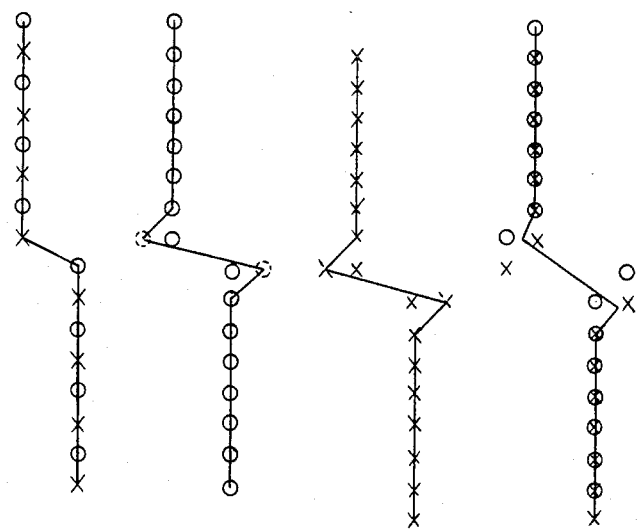
FIG.7a  FIG.7b  FIG.7c  FIG.7d

FIG. 8
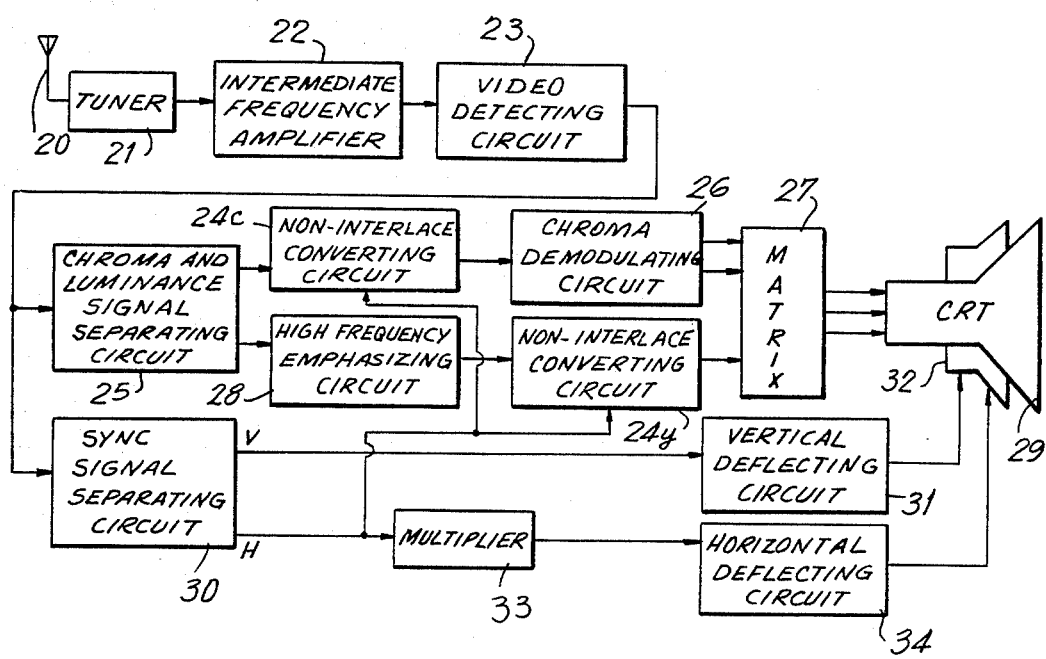
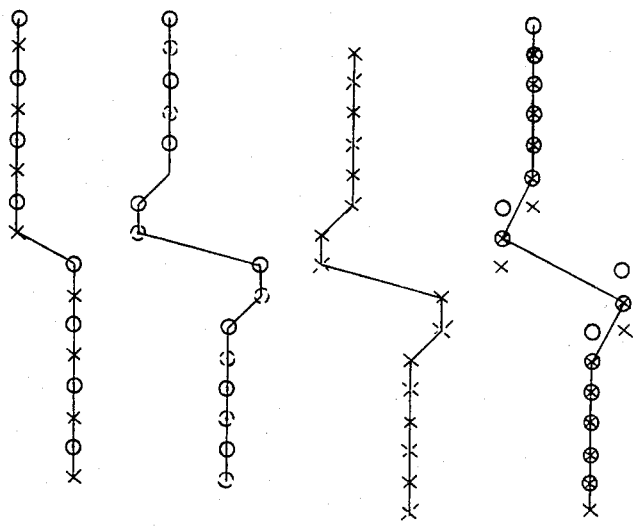
FIG.9a    FIG.9b   FIG.9c   FIG.9d

DOUBLE-SCANNING NON-INTERLACE TELEVISION RECEIVER WITH VERTICAL APERTURE CORRECTION CIRCUIT

CROSS-REFERENCES TO RELATED APPLICATIONS

Reference is made to copending applications Ser. Nos. 439,206, and 440,985, assigned to the assignee of the present application, and containing related subject matter.

BACKGROUND OF THE INVENTION

1. Field of the Invention

This invention relates to non-interlace television receivers, and more particularly, to a double-scanning non-interlace television receiver with a vertical aperture correction circuit.

2. Description of the Prior Art

Present television systems, such as the NTSC system, employ an interlace scanning line method in which one picture or frame is comprised of two interlaced fields of scanned lines. The interlace system was developed to increase the number of scanning lines as much as possible in order to reduce undesirable flicker in the picture and yet remain within the limited frequency band available for transmission.

One suggested apparatus for improving the sharpness of a television picture uses a delay circuit for one horizontal period of a scanning line to emphasize, in a vertical direction, the high frequency components of the video signal to be displayed.

When a video signal which is displayed as a vertical line having a significant change between two adjacent points in the level or brightness thereof is emphasized by such a high frequency emphasizing circuit, the video signal so emphasized has a preshoot at the point before the change in level, where the level is under-emphasized, and an overshoot at the point after the change in level, where the level is over-emphasized. It is to be appreciated that the two points between which the change in level or brightness occurs are positioned on successive horizontal scanning lines. In an interlace scanning system, both video signals for the two fields of scanning lines are emphasized, so that each level corresponding to the preshoot and overshoot is displayed on two lines. It is preferable for maximum picture sharpness that each level corresponding to the preshoot and overshoot be displayed on one line, however.

OBJECTS AND SUMMARY OF THE INVENTION

Accordingly, it is an object of the present invention to provide a double-scanning non-interlace television receiver with a vertical aperture correction circuit which can eliminate the above-described defects of conventional television receivers.

It is another object of the present invention to provide a double-scanning non-interlace television receiver with a vertical aperture correction circuit which can improve the sharpness of a television picture.

In accord with an aspect of the present invention, a double-scanning non-interlace television receiver for receiving an interlace television signal having alternating odd and even fields of scanned lines which are interlaced, as displayed, comprises receiver means for receiving the interlace television signal and for generating interlace scanning line signals from each field, visual display means, non-interlace converting means for converting the interlaced scanning line signals for each of the fields to non-interlace scanning line signals for display on the visual display means, with each of the scanned lines being scanned twice, and means for emphasizing the high frequency components of the interlace scanning line signals.

The above, and other objects, features and advantages of the present invention will be apparent from the following detailed description of illustrative embodiments thereof which is to be read in connection with the accompanying drawings.

BRIEF DESCRIPTION OF THE DRAWINGS

FIG. 1 is a block diagram illustrating a prior art circuit for emphasizing the high frequency components of a television signal in order to improve the sharpness of a picture derived therefrom;

FIGS. 2a to 2d are waveform diagrams illustrating the operation of the circuit of FIG. 1;

FIG. 3 is a block diagram illustrating a non-interlace converting circuit which converts a video signal for an interlace television system to a video signal for a non-interlace television system;

FIGS. 4a to 4c are timing charts illustrating the operation of the non-interlace converting circuit of FIG. 3;

FIG. 5 is a diagram illustrating the non-interlace television picture displayed by an embodiment of the present invention;

FIG. 6 is a block diagram illustrating one embodiment of a double-scanning non-interlace television receiver with a vertical aperture correction circuit in accord with the present invention;

FIGS. 7a to 7d are waveform diagrams illustrating the operation of the television receiver of FIG. 6;

FIG. 8 is a block diagram illustrating an alternate embodiment of a double-scanning non-interlace television receiver with a vertical aperture correction circuit in accord with the present invention; and FIGS. 9a to 9d are waveform diagrams illustrating the operation of the television receiver of FIG. 8.

DESCRIPTION OF THE PREFERRED EMBODIMENTS

FIG. 1 illustrates a prior art circuit for emphasizing, in a vertical direction, the high frequency components of a video signal. A luminance signal from a luminance signal and chroma signal separating circuit (not shown) is supplied to an input terminal 1 and thence, to a pair of delay circuits 2, 3 connected in series. Each delay circuit 2, 3 delays the luminance signal for one horizontal period. The luminance signal is also supplied to a multiplying circuit 5 which multiplies the luminance signal supplied thereto by a minus one-half $(-\frac{1}{2})$. An output signal of delay circuit 2 is supplied to an adding circuit 4. An output signal of delay circuit 3 is supplied to a second multiplying circuit 6 which also multiplies the signals supplied thereto by minus one-half $(-\frac{1}{2})$. An output signal from multiplying circuit 6 is supplied to adding circuit 4. When a video signal which is displayed as a vertical line with a significant change in the level or brightness thereof between two points is supplied to input terminal 1, adding circuit 4 generates a video signal corresponding to the vertical line and having a preshoot or undershoot (where the level is decreased, or under-emphasized) and an overshoot (where the level is increased, or over-emphasized) in the level of the signal before and after the change. It is to be appreciated that the two points between which the level or brightness changes are positioned on adjacent horizontal scanning lines. The output signal from adding circuit 4 is supplied to an attenuator 7 which attenuates the signal and supplies it to a second adding circuit 8. The output signal from delay circuit 2 is also supplied to adding circuit 8. Adding circuit 8 supplies an output signal in response to the aforesaid input signals to an output terminal 9. The high frequency components of a video signal are accordingly emphasized in a vertical direction.

FIG. 2a is a representation for an interlace television receiver of the level of a portion of a waveform of a video signal which is displayed as a vertical line having a significant change in the level thereof between two points. In FIGS. 2a to 2d, the O marks indicate the video signal in the odd field, while the X marks indicate the video signal in the even field. If the video signal of FIG. 2a is supplied to the circuit of FIG. 1, the video signal corresponding to the odd field is illustrated in FIG. 2b. The video signal for the even field is illustrated in FIG. 2c. When the signals for both even and odd fields from the circuit of FIG. 1 are displayed together, as illustrated in FIG. 2d, the preshoot and the overshoot appear on two horizontal scanning lines. It is preferable, however, that each preshoot and each overshoot appear on one line for maximum picture sharpness.

A circuit for converting an interlace television signal to a non-interlace television signal is illustrated in FIG. 3 and includes an input terminal 10 supplied with the input video signal. Input terminal 10 is coupled to a pair of random access memories (RAMs) 11, 12, each for storing the scanning line signals corresponding to one horizontal period. A synchronizing signal separating circuit 13 supplies a horizontal synchronizing signal separated from the television picture signal to a clock signal generating circuit 14 which generates a write clock signal having a timing corresponding to the horizontal period and a read clock signal having a frequency twice the frequency of the write clock signal. The read and write clock signals are supplied to RAMs 11, 12 through switches 15, 16. The horizontal synchronizing signal from synchronizing signal separating circuit 13 is supplied to a frequency dividing circuit 17. Switches 15, 16 change in position in response to an output signal from frequency dividing circuit 17 whereby switches 15, 16 alternately select RAMs 11, 12.

As illustrated in FIGS. 4a to 4c, the write clock signal is alternately supplied to each of RAMs 11, 12 during every other horizontal period so that a video signal corresponding to each horizontal period is written therein. During the alternating horizontal period, the read clock signal is supplied to the other one of RAMs 11, 12 and the video signal stored therein during the preceding horizontal period is read out twice. The signals thus read out are supplied through a switching circuit 18 to an output terminal 19. Switching circuit 18 is operated in response to a signal from frequency dividing circuit 17. Thus, two video signals are supplied to output terminal 19 during one horizontal period.

In order accurately to display the television picture on a cathode ray tube of a television receiver in accord with the present invention, the horizontal synchronizing signal from synchronizing signal separating circuit 13 is doubled and supplied to the horizontal and vertical deflecting circuits for the cathode ray tube. As illustrated in FIG. 5, two fields of scanned lines are displayed without interlacing in response to an interlace television signal supplied to a television receiver in accord with the present invention.

FIG. 6 illustrates one embodiment of a double-scanning non-interlace television receiver having a vertical aperture correction circuit in accord with the present invention. Antenna 20 receives an interlace television signal which is supplied to a tuner 21, an intermediate frequency amplifier circuit 22, and a video detecting circuit 23. An interlace video signal from video detecting circuit 23 is supplied to a non-interlace converting circuit 24 where it is converted to a non-interlace video signal as described above with reference to FIG. 3. The non-interlace video signal is supplied to a chroma and luminance signal separating circuit 25 which generates a chroma signal and a luminance signal in response thereto. The chroma signal from chroma and luminance signal separating circuit 25 is supplied to a chroma demodulating circuit 26 in which two color difference signals R-Y, B-Y are demodulated and then supplied to a matrix circuit 27. The luminance signal from chroma and luminance signal separating circuit 25 is supplied to a high frequency emphasizing circuit 28 in accord with the circuit of FIG. 1. High frequency emphasizing circuit 28 supplies an output signal to matrix circuit 27, which is then supplied to a cathode ray tube (CRT) 29.

The video signal from video detecting circuit 23 is also supplied to a sync signal separating circuit 30 which separates a vertical synchronizing signal and a horizontal synchronizing signal therefrom. The vertical synchronizing signal from sync signal separating circuit 30 is supplied to a vertical deflecting circuit 31 associated with a deflecting coil 32 of CRT 29. The horizontal synchronizing signal from sync signal separating circuit 30 is supplied to a multiplying circuit or a multiplier 33 which, in the illustrated embodiment, doubles the frequency of the horizontal synchronizing signal. The doubled horizontal synchronizing signal from multiplier 33 is supplied to a horizontal deflecting circuit 34 associated with deflecting coil 32. Thus, the horizontal deflection of the picture signal displayed on the television receiver of FIG. 6 occurs twice as fast as the deflection in a conventional television receiver.

FIG. 7a is a representation for an interlace television receiver of the level of a portion of a waveform of a video signal corresponding to a displayed vertical line having a significant change in the level thereof between two points. As described before, the two points are positioned on adjacent horizontal scanning lines. As in FIGS. 2a to 2d, the O marks indicate the video signal of the odd field, and the X marks indicate the video signal of the even field. The luminance components of the scanning line signals are supplied to high frequency emphasizing circuit 28 to generate the video signals with the preshoots and overshoots as indicated in FIGS. 7b and 7c in the broken O marks and the broken X marks. When the two signals of FIGS. 7b and 7c are supplied for display on CRT 29 in accord with the present invention, the result is illustrated in FIG. 7d. When the signal levels from the even and odd fields do not coincide, the time integrating effect of human vision interprets the two signals as the mean or average level of the two signals. Accordingly, the picture is displayed as indicated in the solid line, with each preshoot and overshoot appearing on one line.

The magnitude of the preshoot and the overshoot applied to the input video signal can be determined by suitable modifications to the circuit of FIG. 1. Accordingly, a picture signal with improved sharpness can be displayed since each preshoot and overshoot is placed on one line.

In an alternate embodiment of the television receiver of FIG. 6, non-interlace converting circuit 24 can be connected between chroma and luminance signal separating circuit 25, chroma demodulating circuit 26 and high frequency emphasizing circuit 28. Non-interlace converting circuit 24 can also be connected to two color difference signal circuits positioned between chroma demodulating circuit 26 and matrix circuit 27.

Yet another embodiment of a double-scanning non-interlace television receiver with an aperture correction circuit is illustrated in FIG. 8 and includes many of the same components as the embodiment of FIG. 6. However, a chroma signal non-interlace converting circuit 24c is connected between chroma and luminance signal separating circuit 25 and chroma demodulating circuit 26. A luminance signal non-interlace converting circuit 24y is connected between high frequency emphasizing circuit 28 and matrix circuit 27. The remaining components of FIG. 8 operate as discussed with reference to FIG. 6, and will not be repeated here for the sake of brevity.

If a video signal corresponding to a displayed vertical line with a significant change in the level or brightness thereof between two points as illustrated in FIG. 9a is supplied to the circuit of FIG. 8, high frequency emphasizing circuit 28 produces the signals with preshoots and overshoots indicated in FIGS. 9b and 9c. As discussed above, the O marks indicate the video signal of the odd field and the X marks indicate the video signal of the even field. When the video signals associated with the lines of FIGS. 9b and 9c are supplied to non-interlace converting circuit 24y, the interlace scanning line signals generated thereby are displayed as indicated in FIGS. 9b and 9c in the broken O's and the broken X's. FIG. 9d illustrates the display on CRT 29 of the video signals associated with FIGS. 9b and 9c. Accordingly, the video signal is displayed as indicated by the solid line, with each preshoot and each overshoot on one line.

In an alternate embodiment of the television receiver of FIG. 8, non-interlace converting circuit 24c can be connected to two color difference signal circuits positioned between chroma demodulating circuit 26 and matrix circuit 27. In still a further embodiment, non-interlace converting circuits 24c, 24y can be replaced with a non-interlace converting circuit which receives the three interlace color signals generated by matrix circuit 27 and supplies three non-interlace color signals to CRT 29.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

What is claimed is:

1. A double-scanning non-interlace television receiver for receiving an interlace television signal having alternating odd and even fields of scanned lines which are normally interlaced, as displayed, comprising:
   receiver means for receiving said interlace television signal and generating interlace scanning line signals from each said field;
   visual display means;
   non-interlace converting means for converting said interlace scanning line signals for each of said fields to non-interlace scanning line signals which are displayed on said visual display means, with each of said scanned lines being scanned twice; and
   emphasizing means for emphasizing the high frequency components of said non-interlace scanning line signals.

2. The television receiver of claim 1; wherein said emphasizing means comprises:
   first dividing means for generating first divided output signals in response to said interlace scanning line signals;
   first delay means for generating first delayed output signals in response to said interlace scanning line signals;
   second delay means for generating second delayed output signals in response to said first delayed output signals;
   second dividing means for generating second divided output signals in response to said second delayed output signals;
   first summing means for generating first summed signals in response to said first divided output signals, said first delayed output signals, and said second divided output signals;
   attenuator means for generating attenuated output signals in response to said first summed signals; and
   second summing means for generating second summed signals in response to said first delayed output signals and said attenuated output signals.

3. The television receiver of claim 2; wherein said first delay means delays said interlace scanning line signals by a first predetermined amount and said second delay means delays said first delayed output signals by a second predetermined amount.

4. The television receiver of claim 3, in which said interlace scanning line signals have a horizontal period; and wherein said first and second predetermined amounts are one said horizontal period.

5. The television receiver of claim 1, in which said scanning line signals include chroma and luminance signals; and further comprising separating means connected between said non-interlace converting means and said emphasizing means for separating said chroma signals and said luminance signals from said non-interlace scanning line signals and for supplying said luminance signals to said emphasizing means.

6. The television receiver of claim 5; and further comprising chroma demodulating means connected between said separating means and said visual display means for demodulating said chroma signals separated by said separating means.

7. The television receiver of claim 6; wherein said visual display means includes matrix means connected to said chroma demodulating means and said emphasizing means.

8. The television receiver of claim 1; wherein said receiver means comprises:
   tuner means for tuning said interlace television signal;
   intermediate frequency amplifying means connected to said tuner means; and
   video detecting means connected to said intermediate frequency amplifying means.

9. The television receiver of claim 1; wherein said visual display means includes a cathode ray tube.

10. The television receiver of claim 1, in which said interlace television signal has vertical and horizontal sync signals with vertical and horizontal frequencies; and further comprising:

sync separating means for separating said sync signals from said interlace television signal;

vertical deflecting means for driving said visual display means in response to said vertical sync signals;

frequency multiplier means for multiplying said horizontal frequency of said horizontal sync signals; and horizontal deflecting means for driving said visual display means in response to said horizontal sync signals multiplied by said frequency multiplier means.

11. The television receiver of claim 10; wherein said frequency multiplier means doubles said frequency of said horizontal sync signals.

12. A double-scanning non-interlace television receiver for receiving an interlace television signal having alternating odd and even fields of scanned lines which are normally interlaced, as displayed, comprising:

receiver means for receiving said interlace television signal and generating interlace scanning line signals from each said field;

visual display means;

emphasizing means for emphasizing the high frequency components of said interlace scanning line signals to generate emphasized interlace scanning line signals; and non-interlace converting means for converting said emphasized interlace scanning line signals for each of said fields to non-interlace scanning line signals which are displayed on said visual display means, with each of said scanned lines being scanned twice;

said emphasizing means being connected between said receiver means and said non-interlace converting means.

13. The television receiver of claim 12, in which said scanning line signals include chroma and luminance signals; and further comprising separating means connected to said receiver means for separating said chroma signals and said luminance signals from said interlace scanning line signals and for supplying said luminance signals to said emphasizing means.

14. The television receiver of claim 13; and further comprising chroma signal non-interlace converting means for generating non-interlace chroma signals in response to said chroma signals from said separating means and for supplying said non-interlace chroma signals to said visual display means for display by the latter.

15. The television receiver of claim 14; and further comprising chroma demodulating means connected between said chroma signal non-interlace converting means and said visual display means for generating color difference signals in response to said non-interlace chroma signals.

16. The television receiver of claim 15; wherein said visual display means includes matrix means connected to said chroma demodulating means and said non-interlace converting means.

17. The television receiver of claim 12; wherein said emphasizing means comprises:

first dividing means for generating first divided output signals in response to said interlace scanning line signals;

first delay means for generating first delayed output signals in response to said interlace scanning line signals;

second delay means for generating second delayed output signals in response to said first delayed output signals;

second dividing means for generating second divided output signals in response to said second delayed output signals;

first summing means for generating first summed signals in response to said first divided output signals, said first delayed output signals, and said second divided output signals;

attenuator means for generating attenuated output signals in response to said first summed signals; and second summing means for generating second summed signals in response to said first delayed output signals and said attenuated output signals.

18. The television receiver of claim 17; wherein said first delay means delays said interlace scanning line signals by a first predetermined amount and said second delay means delays said first delayed output signals by a second predetermined amount.

19. The television receiver of claim 18, in which said interlace scanning line signals have a horizontal period; and wherein said first and second predetermined amounts are one said horizontal period.

20. The television receiver of claim 12; wherein said receiver means comprises:

tuner means for tuning said interlace television signal;

intermediate frequency amplifying means connected to said tuner means; and video detecting means connected to said intermediate frequency amplifying means.

21. The television receiver of claim 12; wherein said visual display means includes a cathode ray tube.

22. The television receiver of claim 12, in which said interlace television signal has vertical and horizontal sync signals with vertical and horizontal frequencies; and further comprising:

sync separation means for separating said sync signals from said interlace television signal;

vertical deflecting means for driving said visual display means in response to said vertical sync signals;

frequency multiplier means for multiplying said horizontal frequency of said horizontal sync signals; and horizontal deflecting means for driving said visual display means in response to said horizontal sync signal multiplied by said frequency multiplier means.

23. The television receiver of claim 22; wherein said frequency multiplier means doubles said frequency of said horizontal sync signals.

* * * * *